April 17, 1962    D. L. McKAY    3,029,948

FILTERING TECHNIQUE

Filed Sept. 16, 1957

INVENTOR.
D. L. MC KAY
BY Hudson and Young
ATTORNEYS

United States Patent Office 3,029,948
Patented Apr. 17, 1962

3,029,948
FILTERING TECHNIQUE
Dwight L. McKay, Bartlesville, Okla., assignor to Phillips Petroleum Company, a corporation of Delaware
Filed Sept. 16, 1957, Ser. No. 684,249
4 Claims. (Cl. 210—68)

This invention relates to the separation of solids and liquids. In one aspect it relates to an improved method for operation of a continuous vacuum filter. In another aspect the invention relates to an improved method for cleaning a filter medium in a continuous vacuum filter which can be made automatic.

Filtration is the separation of solids from a liquid and is effected by passing the liquid through a porous medium so that the solids are retained upon the surface of the medium in the form of a cake. It is obvious that the pores in the porous medium must be smaller than the size of the particles of solid; however, in order to maintain the pressure drop across the porous medium as low as posible the size of the pores will approach that of the particles of solid. In nearly all filtering operations the particle size of the solids varies considerably so that some particles will pass through the filter medium and other particles will become lodged in the pores of the filter medium. This eventualy leads to plugging or blinding of the filter and the filter medium must be cleaned or replaced. One method of cleaning a filter medium or filter cloth has been to remove the filter case and brush the filter cloth with a stiff brush. This method is laborious and time consuming but can be accomplished without removing the filter cloth from the filter. Another method for cleaning a filter cloth, where the solid particles can be dissolved in a solvent, is to remove the filter cloth from the filter and wash it in an excess of a solvent for the solid which forms the plugs in the filter cloth.

It is the principal object of this invention to provide a method for cleaning a plugged filter medium on a continuous vacuum filter without removing the filter medium or the filter case cover.

It is another object of this invention to provide a method of cleaning a filter medium on a continuous vacuum filter which can be adapted to automation.

Figure 1:
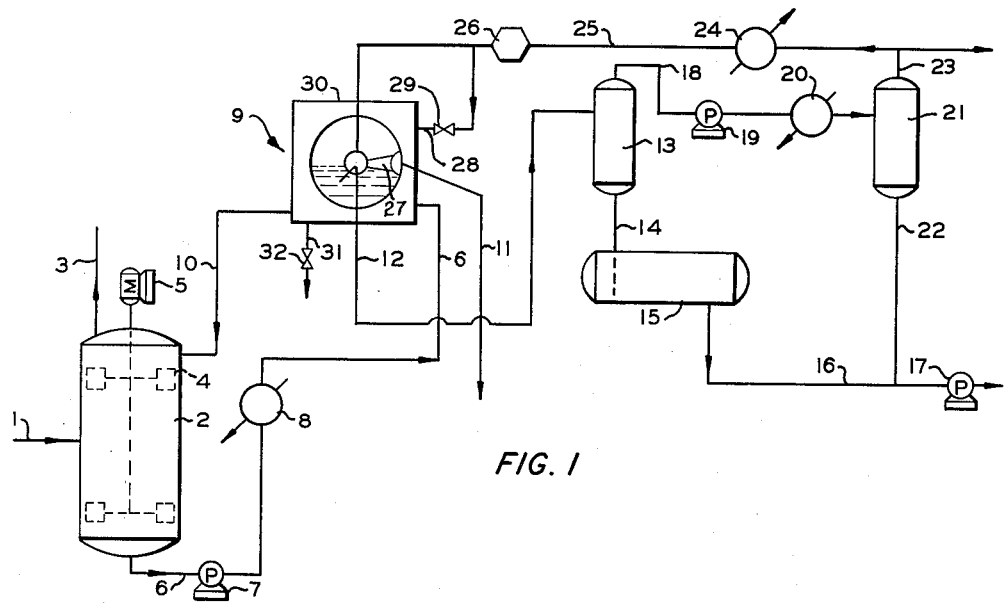
Figure 2:
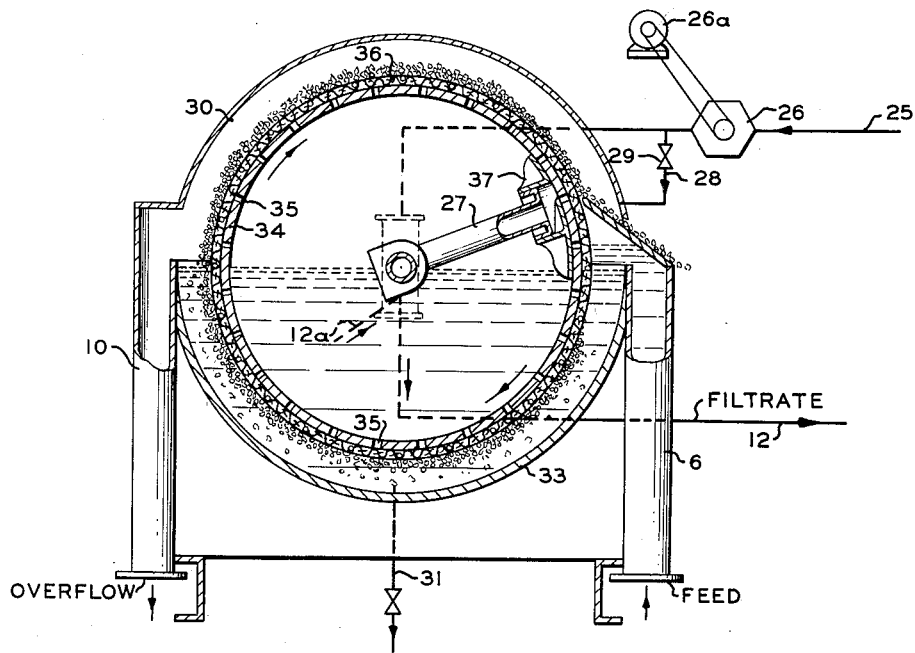

Other objects and advantages of the invention will be apparent upon studying this disclosure including the attached drawing wherein;

FIGURE 1 is a schematic flowsheet of the filtering operation in a process for producing solid polyethylene; and FIGURE 2 is a view of the filter of FIGURE 1 in more detail.

Broadly the invention contemplates cleaning the filter cloth on a continuous vacuum filter by withdrawing the slurry and filtrate from the filter, drying the filter cloth by pulling a heated gas through the media until the cloth is dry, and with the drum rotating passing a blast of gas through the filter cloth in the opposite direction to the flow of filtrate. The invention is applicable with any continuous vacuum filter having blow-back provision. Provision should be made to by-pass at least a portion of the blow-back gas to the interior of the case so as to reduce the pressure drop across the filter cloth at the point of blow-back. The invention is applicable to any type of filter medium such as cloth, screen or strings or other medium in which particles become embedded in the holes or pores of the filter medium. The invention is applicable wherein a solid particle substantially fills a pore in the filter medium when both are wet with the filtrate but wherein the particle does not fill the pore when both are dry or free of filtrate. The process is particularly applicable to filter media blinded with solid particles of a polymer or copolymer of a 1-olefin such as polyethylene or a copolymer of ethylene and propylene.

Reference is now made to the drawing and particularly to FIGURE 1. A slurry of solid ethylene polymer in cyclohexane, recovered from a polymerization reaction (not shown) is fed via conduit 1 to surge tank 2. Vapors are removed via conduit 3. The slurry in surge tank 2 is maintained in a state of agitation so as to avoid settling of the polymer by stirrer 4 which is powered by motor 5. Slurry is withdrawn from surge tank 2 via conduit 6 and passed by means of pump 7 through cooler 8 to filter 9. Excess slurry over that required to maintain the proper slurry level in filter 9 is returned to surge tank 2 via conduit 10. Filter cake from filter 9 is removed via conduit 11 and is passed to further purification steps (not shown). Filtrate and vapors are withdrawn from filter 9 via conduit 12 and are passed to liquid-vapor separator 13 wherein liquid is removed from the bottom via conduit 14 which serves as a barometric leg by being connected to filtrate receiver 15 so that the end of conduit 14 is below the surface of liquid in receiver 15. Filtrate, which comprises a dilute solution of polyethylene in cyclohexane, is passed via conduit 16 and pump 17 to cyclohexane recovery steps (not shown). Vapors are removed from liquid-vapor separator 13 via conduit 18 and are passed by means of pump 19 through cooler 20 to knockout drum 21 wherein additional liquid cyclohexane resulting from condensation in cooler 20 is recovered by means of conduit 22 and pump 17. Cyclohexane vapors are passed from knockout drum 21 via conduit 23, heater 24 and conduit 25 to filter 9. Pulse valve 26 is positioned in conduit 25 to provide a pulsing pressure directed in the opposite direction to the passage of fluid in forming the filter cake so as to aid in removing the filter cake from the filter medium. Conduit 25 is connected to gas supplied to the blow-back 27 positioned within the drum of filter 9 and conduit 28 containing valve 29 is connected between conduit 25 and the case 30 of filter 9 so as to by-pass a controlled portion of the gas vapors in conduit 25 around the blow-back device 27. Drain conduit 31 containing valve 32 permits withdrawal of all of the slurry contained in filter 9.

FIGURE 2 shows in more detail the filter 9 of FIGURE 1. Filter 9 comprises filter case 30 (which seals the filter from the atmosphere) containing filter pan 33 with the feed conduit 6 and overflow conduit 10 so as to maintain a substantially constant level of filtrate and slurry in the filter pan 33 and filter drum 34. Filter drum 34 is made pervious to the flow of filtrate by means of openings 35 spaced over the entire periphery of the drum. Filter drum 34 is covered by a filter medium 36. Filtrate is withdrawn from the interior of filter drum 34 by means of conduit 12 and induction pipe 12A which dips into the body of filtrate in drum 34. Gases and vapors are also withdrawn from the filter by means of conduit 12.

Blow-back device 27 is positioned on the axis of drum 34 so as to direct a flow of gas or vapor through the filter medium adjacent the locus of withdrawal of filter cake so as to aid in removing filter cake from the filter medium. Shoe 37 provides a seal between the blow-back device 27 and the inner surface of drum 34 so as to direct the flow of gas or vapor through the wall of drum 34 at the directed point. Vapors are passed to blow-back device 27 via conduit 25 containing pulse valve 26 powered by motor 26A. Pulse valve 26 can conveniently be a star valve or any other device which will provide a pulsating flow of gas or vapor to blow-back device 27. Bypass 28 is connected to conduit 25 and to the interior of case 30 so that the pressure drop across the filter medium can be controlled within a predetermined range by operation of valve 29 so as to direct more or less gas through blow-back device 27. Conduit 31 provides means for draining the filtrate contained in drum 34 and the slurry contained in pan 33 from the filter 9 when it becomes necessary to clean filter medium 36.

The operation of the method of the invention will now be described with reference to FIGURE 2. Slurry is fed to filter 9 via conduit 6 so that flow is maintained in conduit 10 thus maintaining pan 33 liquid full. After a period of operation the filter medium becomes plugged with particles of polymer and it becomes necessary to clean the filter medium in order to obtain satisfactory filtering operations.

The flow of slurry via conduit 6 is stopped and pan 33 is drained via conduit 31. Clockwise rotation of drum 34 is continued and by-pass valve 29 is opened so that most of the flow of gas is into case 30 and through filter medium 36 so as to dry the filter medium. The filter medium is dry when the temperature of the gas in drum 34 is the same as the blow-back gas temperature. By-pass valve 29 is then closed so as to increase the flow of gas through the filter medium by means of blow-back means 27 and to blow the dried polymer particles from the filter medium. The by-pass valve 29 is then reset, pan 33 is refilled with slurry and the filtering operation is resumed.

The pulse valve in the pressure line aids is removing polymer which tends to plug the filter medium by imparting a flutter, or undulating action to the filter medium. At low (near zero) pressure, or volume, the pulse valve gives a square type pressure wave. At higher pressures, or volumes, a sine type pressure wave is approached. The square type wave produces the better flutter action and filter cake removal. The blow-back pressure can be in the range 5 to 40 inches of water, however, a blow-back pressure of 5 to 10 inches of water is preferred.

Operating conditions will vary with the type of polymer produced and the solvent or diluent utilized. In a system using cyclohexane as diluent in the production of polyethylene in the presence of a chromium oxide catalyst, containing hexavalent chromium and associated with silica, alumina, silica-alumina, zirconia, thoria, etc., the following conditions are typical (numerals coincide with those of the drawing):

Table I

| Drawing Number | 2 | 33 | 12A | 15 | 21 |
| --- | --- | --- | --- | --- | --- |
| Temperature, ° F | 120 | 120 | 120 | 105 | 100 |
| Pressure, p.s.i.a. | 14.7 | 14.7 | 7.35 | 14.7 | 15.5 |

A specific embodiment of the invention is illustrated by the following report of runs conducted on the catalyst-free effluent of a polymerization reaction wherein ethylene was polymerized in the presence of cyclohexane and a catalyst comprising a coprecipitated silica-alumina (90–10) base impregnated with chromium oxide containing an appreciable amount of hexavalent chromium.

The reactor effluent was freed of catalyst and volatile components and was cooled to precipitate the polymer. The slurry of polymer in cyclohexane was fed at a temperature of 122° F. to a Bird-Young continuous vacuum filter, described on page 983 of Chemical Engineers Handbook, Third Edition, published by McGraw-Hill Book Company, Inc., New York (1950). A type FA–1100 Orlon filter cloth obtained from National Filter Media Company was used. The filter was operated at 8 r.p.m. and the by-pass valve (29 of the drawing) was adjusted to maintain the blow-back pressure between 5 and 10 inches of water. Filter cloth plugging, or blinding, was determined by observation of the filter cake through a window in the filter case and also by a decrease in filtrate withdrawal rate.

When it was decided that the filter cloth should be cleaned the flow of slurry to the filter was discontinued and the filter pan was drained of slurry. Filtrate was withdrawn from the filter drum by the induction tube. The by-pass valve (29), on the blow-back was opened so that most of the flow of gas was into the case and through the filter cloth so as to dry the filter cloth. The filter cloth was dry when the temperature of the gas on the filtrate side was the same as the blow-back temperature. When the filter cloth was dry the by-pass valve on the blow-back was closed and the dried polymer was blown from the cloth. Cleaning time was about 15 minutes.

Prior to my invention, it was necessary to shut down the filter, remove the cover and brush the filter cloth by hand. Such procedure was wasteful of time and labor. The method of my invention can easily be made automatic. One example of automatic operation would be to continuously determine filtrate withdrawal rate and to start the cleaning cycle when the rate reaches a predetermined minimum. Drying cycle would continue until the temperature of the gas in the drum was the same as that of the blow-back gas. The blow cycle for removing dried particles would be time controlled.

Reasonable variations and modifications are possible within the scope of the disclosure of the present invention which comprises improved method for cleaning the filter medium in a continuous rotary drum vacuum filter wherein a blow cycle is utilized which comprises substantially completely drying the filter medium and increasing the volume of drying gas to the blow cycle to blow dried solids from the filter medium.

That which is claimed is:

1. The method of cleaning the filter medium of a continuous rotary drum vacuum filter which has become plugged with solids, a particle of which substantially fills a pore of the filter medium when both are wet but does not fill the pore when both are dry, wherein solids are picked up by the filter from a feed slurry of solid particles, filter cake is removed from the filter medium and withdrawn from the filter, a hot drying gas is passed through the filter medium adjacent the locus of filter cake withdrawal to remove the filter cake, which method comprises the steps of removing the feed slurry from the filter; removing the filter cake; passing hot drying gas through the filter medium to the interior of the drum after removal of the filter cake until the filter medium and solids attached thereto which have caused the plugging are substantially completely dry; and then passing an increased quantity of hot drying gas, over that quantity required to remove the filter cake, through the filter medium adjacent the locus of filter cake withdrawal to blow dried solids from the filter medium.

2. The method of claim 1 wherein a pulsation is provided to the hot drying gas passed through the filter medium to blow dried solids from the filter medium by periodically stopping the flow of drying gas.

3. The method of claim 1 wherein the pressure of the hot drying gas passed through the filter medium to blow dried solids from the filter medium is maintained in the range of about 5 to 40 inches of water.

4. In the method of separating solids from a liquid slurry with a continuous vacuum filter comprising a rotary drum, slurry pan, and filter case wherein a filter cake is formed on the drum surface while submerged in a feed slurry supplied to the slurry tank, dried by a flow of drying gas passed to the interior of the filter case, and discharged from the drum surface by a flow of gas passed through the filter drum surface at the point of discharge of filter cake, the improved method of operating said filter comprising the steps of periodically terminating the supply of slurry to the slurry pan; removing slurry from the slurry pan; removing filtrate from the drum; removing the filter cake from the drum; increasing the quantity of drying gas flowing to the filter case so as to dry the filter drum surface while continuing rotation of the drum; terminating the flow of drying gas to the filter case; increasing the quantity of gas flowing through the filter drum surface at the point of discharge of filter cake over that required to discharge the filter cake so as to blow dried solids from the drum surface; renewing the supply of feed slurry to resume the separation of solids from said slurry; and passing a flow of drying gas to the interior of the filter case.

References Cited in the file of this patent

UNITED STATES PATENTS

| | | |
|---|---|---|
| 1,199,861 | Barstow et al. | Oct. 3, 1916 |
| 1,348,159 | Down | Aug. 3, 1920 |
| 1,512,321 | Wait | Oct. 21, 1924 |
| 1,774,044 | Sweetland | Aug. 26, 1930 |
| 1,895,276 | Cole | Jan. 24, 1933 |
| 2,337,385 | Gross | Dec. 21, 1943 |
| 2,341,045 | Kiersted | Feb. 8, 1944 |
| 2,379,754 | Selensky | July 3, 1945 |
| 2,525,135 | Huff | Oct. 10, 1950 |
| 2,851,161 | Dahlstrom et al. | Sept. 9, 1958 |